(12) United States Patent
Kramlich

(10) Patent No.: US 8,596,640 B1
(45) Date of Patent: Dec. 3, 2013

(54) STORYTELLING GAME AND METHOD OF PLAY

(71) Applicant: Jacob G. R. Kramlich, St. Louis Park, MN (US)

(72) Inventor: Jacob G. R. Kramlich, St. Louis Park, MN (US)

( * ) Notice: Subject to any disclaimer, the term of this patent is extended or adjusted under 35 U.S.C. 154(b) by 0 days.

(21) Appl. No.: 13/664,746

(22) Filed: Oct. 31, 2012

Related U.S. Application Data

(62) Division of application No. 12/238,620, filed on Sep. 26, 2008, now abandoned.

(60) Provisional application No. 60/975,829, filed on Sep. 28, 2007.

(51) Int. Cl.
*A63F 3/00* (2006.01)

(52) U.S. Cl.
USPC ........... 273/236; 273/243; 273/269; 434/156; 434/159; 434/160; 434/167; 434/169; 434/176; 434/178; 434/185; 434/317; 434/318; 434/322; 434/362; 463/35

(58) Field of Classification Search
USPC ......... 434/362, 322, 169, 156, 178, 167, 159, 434/160, 176, 185, 317, 318; 463/35; 273/236, 269, 243
See application file for complete search history.

(56) References Cited

U.S. PATENT DOCUMENTS

| 1,379,871 | A | | 5/1921 | McGuire, Jr. |
|---|---|---|---|---|
| 3,891,209 | A | | 6/1975 | Kritzberg |
| 4,445,869 | A | | 5/1984 | Wasserman |
| 4,498,674 | A | * | 2/1985 | Ferris et al. .................. 273/243 |
| 4,637,799 | A | * | 1/1987 | Bouchal ........................ 434/236 |
| 4,684,135 | A | | 8/1987 | Bouchal |
| 5,332,227 | A | * | 7/1994 | Passero ......................... 273/243 |
| 5,415,411 | A | * | 5/1995 | Peterson ....................... 273/237 |
| 5,657,992 | A | | 8/1997 | Bellizzi |
| 5,918,882 | A | * | 7/1999 | Truong ......................... 273/249 |
| 6,398,222 | B1 | * | 6/2002 | Everett ......................... 273/287 |
| 6,638,171 | B1 | * | 10/2003 | Igarashi et al. ................ 463/43 |
| 6,719,290 | B1 | | 4/2004 | Kershner |
| 7,275,747 | B1 | * | 10/2007 | Tanita .......................... 273/408 |
| 7,287,755 | B1 | * | 10/2007 | Kershner ...................... 273/272 |
| 7,300,057 | B1 | * | 11/2007 | Franklin ....................... 273/236 |
| 7,320,467 | B2 | * | 1/2008 | Matilla et al. ................. 273/292 |
| 7,333,967 | B1 | * | 2/2008 | Bringsjord et al. ............. 706/45 |
| 7,494,127 | B2 | * | 2/2009 | Schmidt ........................ 273/299 |
| 7,513,502 | B1 | | 4/2009 | Nygren et al. |
| 2004/0205515 | A1 | | 10/2004 | Socolow et al. |
| 2005/0093239 | A1 | | 5/2005 | Johnston |
| 2005/0227764 | A1 | | 10/2005 | Cantu et al. |

(Continued)

OTHER PUBLICATIONS

"Wait Wait Don't Tell Me", Apr. 23, 2006, NPR, pp. 1-2.*

*Primary Examiner* — Jack Yip
(74) *Attorney, Agent, or Firm* — Deborah A. Basile; Karen K. Chadwell

(57) ABSTRACT

A method of play, wherein play emphasizes storytelling and story recounting abilities, and wherein the method comprises: (a) providing a gaining device which provides for: a plurality of subject elements, wherein each subject element from the plurality of subject elements comprises a topic for a particular story; and a plurality of situational elements, wherein each situational element from the plurality of situational elements qualifies the subject element; (b) pairing a subject element from the plurality of subject elements with a situational element from the plurality of situational elements; and (c) providing a story based on the paired subject element and selected situational element.

2 Claims, 15 Drawing Sheets

(56) References Cited

U.S. PATENT DOCUMENTS

| | | | |
|---|---|---|---|
| 2005/0283741 A1* | 12/2005 | Balabanovic et al. | 715/838 |
| 2006/0175753 A1 | 8/2006 | MacIver et al. | |
| 2006/0253783 A1 | 11/2006 | Vronay et al. | |
| 2006/0257827 A1* | 11/2006 | Ellenson | 434/112 |
| 2007/0007725 A1 | 1/2007 | Matilla et al. | |
| 2007/0009114 A1 | 1/2007 | Kenoyer et al. | |
| 2007/0118801 A1 | 5/2007 | Harshbarger et al. | |
| 2007/0168315 A1* | 7/2007 | Covannon et al. | 707/1 |
| 2008/0012228 A1* | 1/2008 | Shideler et al. | 273/292 |
| 2008/0235576 A1* | 9/2008 | Bringsjord et al. | 715/256 |
| 2008/0256066 A1* | 10/2008 | Zuckerman et al. | 707/5 |
| 2009/0282338 A1* | 11/2009 | Bohms | 715/719 |

\* cited by examiner

|  | ROCK | PAPER | SCISSORS | TIE |
|---|---|---|---|---|
| WHO | LEFT | RIGHT | PICK | ALL |
| SITUATION | FIRST | WORST | LAST | BEST |
| FAKE | WHEN | WHAT | WHERE | TRUTH |
| DARE | MENTAL | PHYSICAL | SHOW | BUDDY |
| ROLE | FREAK | GEEK | SHEIK | SQUEAK/SPEAK |

Figure 5
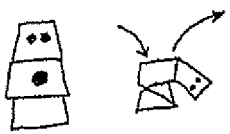
Figure 8
Figure 9
Figure 6
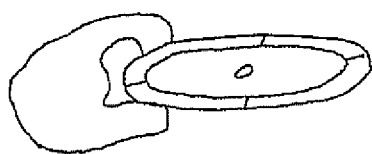
Figure 7
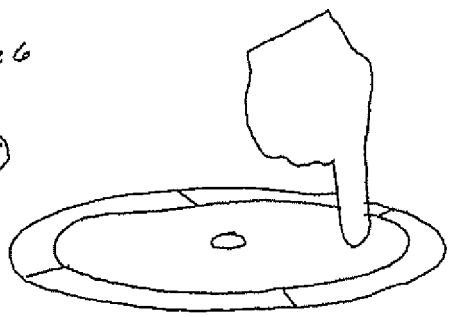
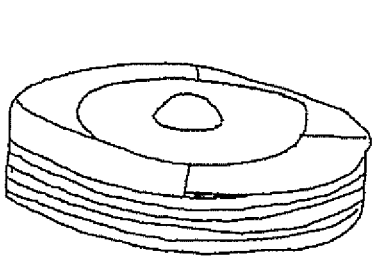
Figure 10
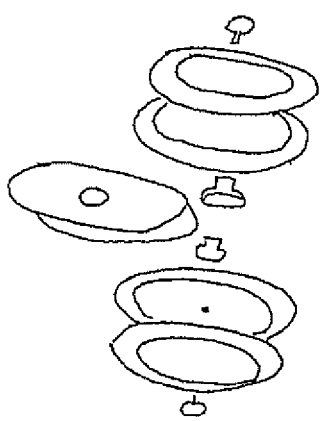
Figure 11

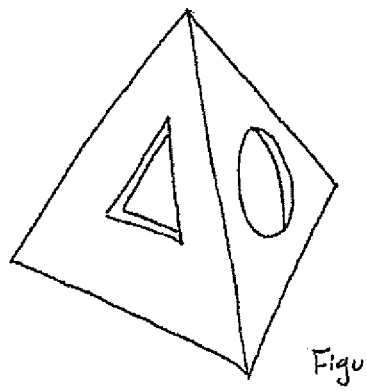
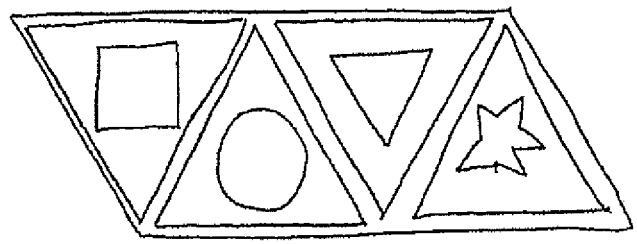
Figure 12
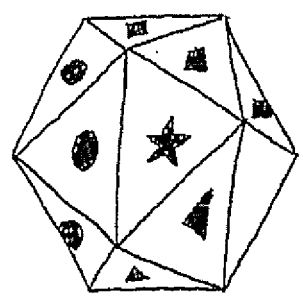
Figure 13
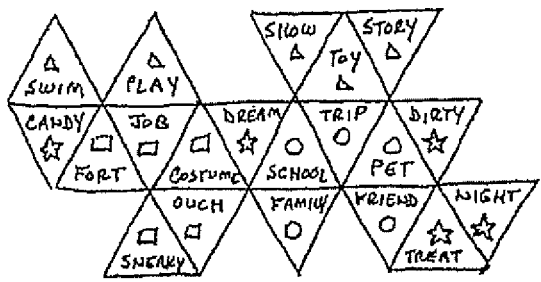

|  | Subject | Subtopic | Situation |
|---|---|---|---|
| Tie | Dream | Wish, Goal | Best |
|  | Camp | Hotel, Home |  |
|  | Music | Concert, Dance |  |
|  | Game | Sport, Club | Every 1 |
|  | Toy | Vehicle, Tool |  |
| Paper | Friend | Roommate, Date | First |
|  | Family | Neighbor, Reunion |  |
|  | School | Teacher, Class |  |
|  | Scar | Broken, Torn | Right |
|  | Pet | Animal, Plant |  |
| Rock | Movie | Theatre, Book | Next |
|  | Learn | Skill, Idea |  |
|  | Holiday | Birthday, Party |  |
|  | Create | Cook, Fix | Left |
|  | Trip | Locate, Park |  |
| Scissors | Water | Beach, Pool | Last |
|  | Gift | Crush, Help |  |
|  | Hobby | Costume, Art |  |
|  | Prank | Trouble, Sneaky | Pick |
|  | Job | Chore, Boss |  |

Figure 14

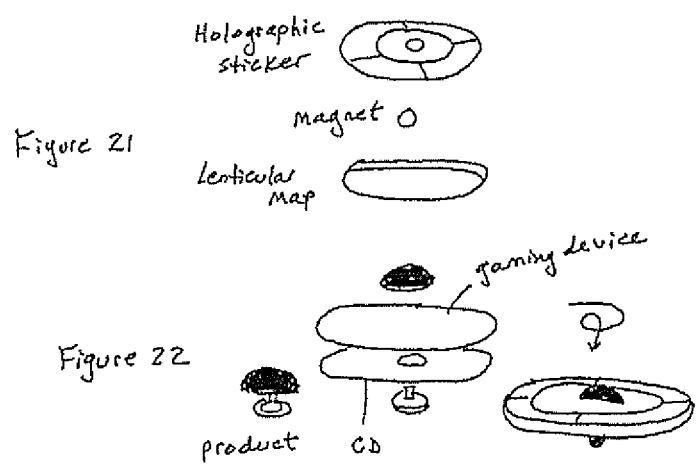
Figure 21
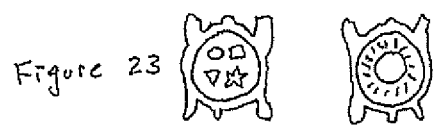
Figure 22
Figure 23
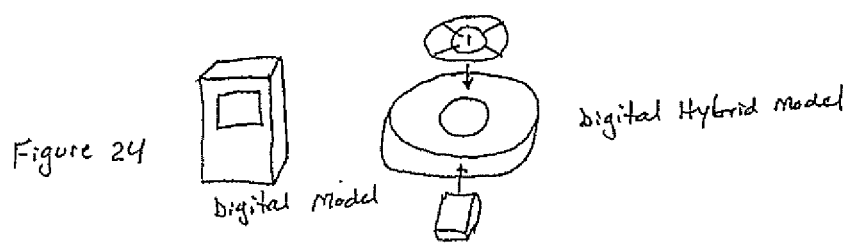
Figure 24

| | | | | | |
|---|---|---|---|---|---|
| INTENTIONS | | I want everyone in my kingdom to enjoy telling their stories | I want to make stories sweeter by asking about details | I want to make stories sweeter by asking about facts | I want to tell the best story |
| COURT | | SHEIK | FREAK | GEEK | SPEAK |
| QUESTIONS | | Any Question | Sense Questions | Fact Questions | Cannot Ask Questions |
| JOBS | | *Chooses Stories *Sets comfort Level *Keeps Order *Makes rules *Tells the last story | *Challenges Sheik *Sets the tone by asking about details *Nominates Freaks (picks best story) | *Remembers stories to overthrow Sheik *Sets the pace by asking about facts *Judges challenges *Nominates Geeks (picks worst story) | *Tells a story |
| ORDER | | LAST | FIRST | NO TURN | |

Figure 25

STORYTELLING GAME AND METHOD OF PLAY

BACKGROUND TO THE INVENTION

1. Field of the Invention

This invention relates generally to an educational game or tool and to the method or system of using the educational game or tool. More particularly, this invention relates to a game playing device, and to its method of play, wherein the method emphasizes the art of storytelling to promote skills involving expression and memory, wherein the game may comprise a range of technical levels.

2. Background of the Invention

The use of word and image stimuli in fostering verbalization and in the development and telling of stories is well known. For example, U.S. Pat. No. 1,379,871, which issued May 31, 1921 to William D. McGuire, Jr., discloses a set of cards each having depicted thereon a scene, an object or descriptive matter used as a device not only for entertainment but also to develop the is faculties of imagination and judgment. The cards have as an object the provision of a game or puzzle, the solution of which requires the development of a plot, theme or story. Accompanying the set of cards is a printed sheet suggesting the theme of the story or plot presented in the picture play depicted on the cards. In play, the players know in advance the title for the particular set of cards selected and will have a synopsis giving the theme of the story or picture play. All the cards in the set are dealt out to the several players. The person having the first card, which might be designated as such, makes the first play by placing the card face up on the playing table. The next player has to either produce the next card in the sequence of the story or else answer "I pass", as is usual in playing card games. As disclosed in the patent, a key can be provided with the card set giving the proper sequence of the cards in order to portray the story or play.

In U.S. Pat. No. 3,891,209, a game is disclosed which is used in psychological testing and therapy. This game comprises two different sets of cards. On each card in each set there is provided a plurality of words. The words on the cards in one set all tend to evoke the same primary emotions, while the words on each card in the other set of cards tend to evoke different primary emotions. The words on the cards are used as a jumping off point for story telling, after a particular set of cards is randomly selected by a player. The player receives an award of two gold stars if he successfully tells a story. The number of gold stars that a player receives may determine the winner in any playing session, or, as disclosed in the patent, the gold stars can be turned in for other awards.

Although the "game" disclosed in U.S. Pat. No. 3,891,209 is in some way tied in with personality and analysis, it is not really a game as such. That is, it involves no competition even though played with others.

Additionally, none of the games heretofore discussed above, however, involve the actual telling of a story based on a randomly selected subject. For example, games involving a story, such as disclosed in U.S. Pat. No. 1,379,871, do not require the players to tell a story based upon the images in the cards involved. Instead, the players are required to play the cards involved in a certain pictorial sequence, that sequence itself telling the story and requiring no verbalization thereof by a player. In U.S. Pat. No. 3,891,209, story telling is involved; however, graphic images do not form the basis for the story telling.

SUMMARY OF THE INVENTION

The present invention relates, in general, to a gaming device and to techniques for stimulating innovation and exercising fundamental thinking and communication skills. More particularly, the invention comprises a storytelling game using randomly selected images in the telling of a randomly determined type of story.

There is provided in accordance with the basic aspects of this invention game devices and methods of play which have as their primary object the stimulation of innovation and the exercising of fundamental thinking and communication skills. Quite advantageously, the invention is in the form of a game which provides, not only inspiration, but education and entertainment as well. The game, moreover, allows for the inclusion of material that specifically references those concepts that players wish to consider.

The storytelling game of the present invention is based on a story-trading formula which develops language arts and social ties, and incorporates a technique of randomly selecting personal memories for the purpose of creating or trading stories amongst a group of people. The formula is based on two variables: a subject and a situation, both of which are embodied in one or more gaming devices which is/are used to execute the formula. That is, the function of the instrument is to determine a particular story's subject and to match it with a particular situation.

BRIEF DESCRIPTION OF THE DRAWINGS

FIG. 5 is a schematic depicting an exemplary indicator comprising a cover;

FIG. 6 is a schematic depicting an exemplary indicator comprising a pointer;

FIG. 7 is a schematic depicting an exemplary indicator comprising a hand;

FIG. 8 is a schematic depicting an exemplary indicator comprising a game piece;

FIG. 9 is a schematic depicting an exemplary indicator comprising another game piece;

FIG. 10 is a schematic depicting an exemplary assembly of an exemplary gaming device;

FIG. 11 is a schematic depicting another exemplary assembly of an exemplary gaming device;

FIG. 12 is a schematic depicting another exemplary gaming device in the shape of a tetrahedron;

FIG. 13 is a schematic depicting another exemplary gaming device in the shape of a 20-sided ball;

FIG. 14 is a schematic depicting another exemplary gaining device in the form of a card;

FIGS. 21-24 are schematics depicting additional exemplary gaining devices;

FIG. 25 is a schematic depicting an exemplary method of play;

DETAILED DESCRIPTION OF THE INVENTION

Figure 1:
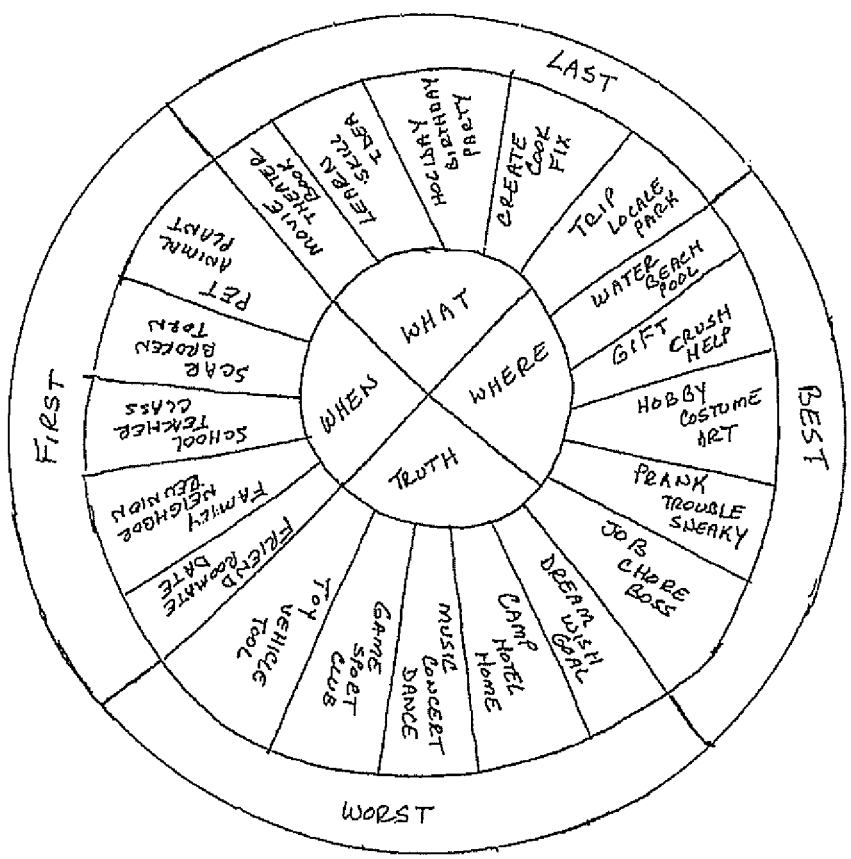
FIG. 1 is a schematic depicting a top side of an exemplary gaming device in the shape of a disc.

The storytelling game of the present invention pairs a story subject to a situation as randomly determined by one or more gaming devices. The storytelling game operates based on the following formula:

$$X*Y=Z$$

where X is equal to a number of general subject elements, Y is equal to a number of situational elements, and Z is equal to the number of stories to be told, wherein the gaming device randomly pairs the general subject element and the situational element. Accordingly, to that end, the gaming device comprises a plurality of general subjects either written or depicted in a picture(s) in association with a plurality of situational elements, which, like the plurality of general subjects, is also either written or depicted in a picture(s).

The plurality of general subjects includes topics for the various stories to be told during the course of play, wherein the specific topics to be told are limitless. However, preferably the plurality of general subjects include those topics that are appropriate and/or appealing to a particular group of players, wherein such topics are preferably selected based on considerations, such as, the age and the interests of a particular group of players.

In addition to the general subjects, there may also be included subtopics which serve to narrow a specific general subject. As will be discussed in greater detail below, the subtopics are used to assist a player in coming up with a story when, for example, the player has difficulty in creating a story without such assistance. As each subtopic(s) is correlated with a respective general subject, the actual subtopic(s) will depend on the nature of the general subject. However, exemplary general topics, and their related subtopics, which are indicated in parentheses, may comprise the following words and/or concepts: DREAM (CRUSH, LUCK); GIFT (KISS, LOVE); NIGHT (DANCE, PARTY); TOY (TOOL, ART); FOOD (MEDICINE, TREAT); FRIEND (ROOMMATE, DATE); FAMILY (NEIGHBOR, REUNION); COSTUME (OUTFIT, DRESSUP); SCHOOL (CLASS, TEACHER); PET (ANIMAL, HERO); STORY (BOOK, MOVIE); SNEAKY (PROBLEM, MESSY); HOBBY (VEHICLE, RIDE); SCAR (BROKEN, SICK); JOB (BOSS, COLLEAGUE); WATER (BEACH, TUB); TRIP (TRAIN, BOAT); PLAY (SPORT, GAME); FORT (HOME, CAMP); MUSIC (CONCERT, THEATER); and the like.

The plurality of situational elements, which are randomly paired with the plurality of general subjects, comprises words and/or concepts that limit or qualify the respective general subject and/or subtopic, wherein each situational element guides a storytelling player in a particular direction to limit the possible number of stories that are possible for any given general subject and/or subtopic. Exemplary situational elements comprise the words FIRST, LAST, NEXT, and BEST, and/or pictures connoting such words.

In addition to the plurality of general subject elements and the plurality of situational elements, the gaming device may further comprise a plurality of storytelling cue elements, wherein such elements include key words and/or concepts used to spark a teller's memory regarding key elements of a story. The storytelling cue elements may be spelled out in writing or may be illustrated. Exemplary storytelling cue elements comprise, for example, the words, WHO, WHAT, WHEN, WHERE, WHY, HOW, TRUTH, and the like.

Now referring to the gaming device itself, the gaming device may comprise any device that allows for a random selection of a general subject and a random selection of a situational element, wherein exemplary gaming devices are depicted in the figures and which are described in greater detail below.

An exemplary gaming device comprises a disc, wherein the disc may comprise any shape that is appealing to the players, and which may comprise the shape and size of, and perform, in addition to the function of performing the game playing method disclosed below, the identical function of, for example, a compact disc, a compact disc case, a flying disc, e.g., a Frisbee®, a drink coaster, a button, a can top, a plate, a platter, a vinyl record, a dartboard, a roulette, and the like. The discs depicted in FIG. 1-3, are especially preferred embodiments of the gaming device due to their simplicity of design, their versatility, their relatively low manufacturing costs, their appealing display, and their distinctive look.

Figures 2, 4:
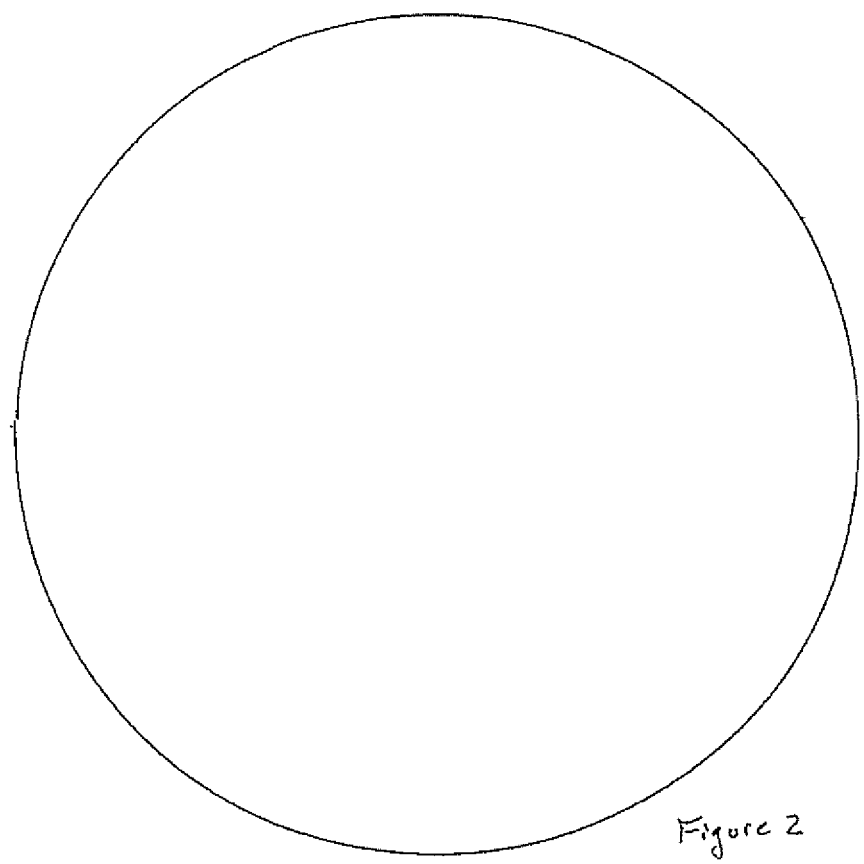
FIG. 2 is a schematic depicting an exemplary back side of the gaming device depicted in FIG. 1.
FIG. 4 is a schematic depicting a chart which depicts a correlation and relationship designed between the exemplary situations, exemplary colors, exemplary shapes, and exemplary symbols.
Figure 3:
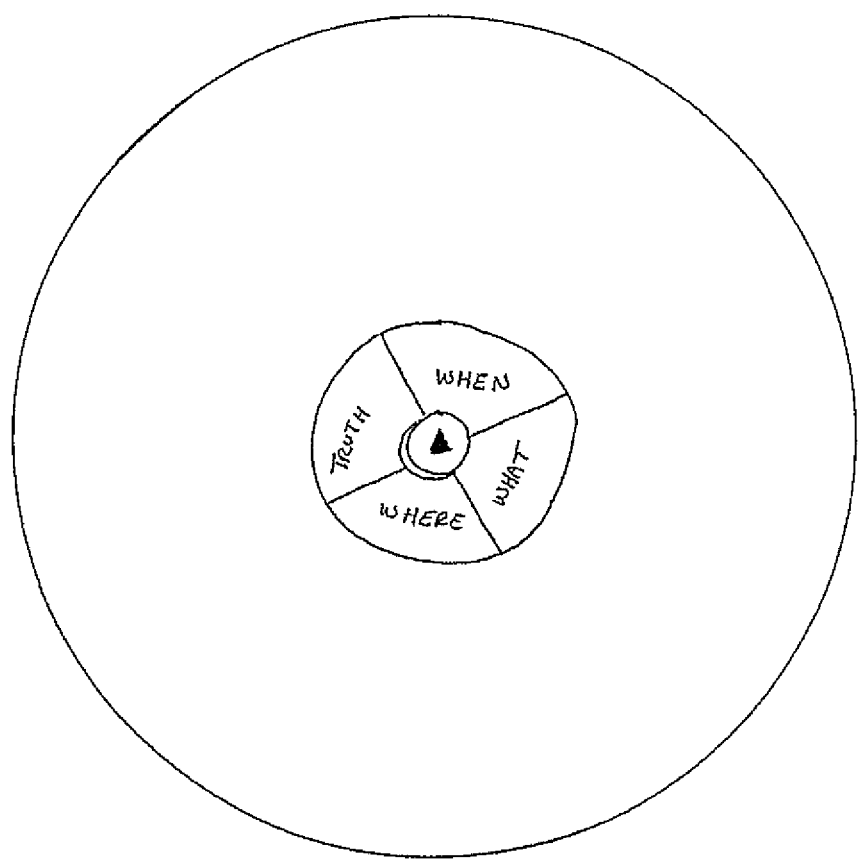
FIG. 3 is a schematic depicting another exemplary back side of the gaming device depicted in FIG. 1.

Referring to FIGS. 1-3, an exemplary disc comprises a sticker, printing or etching on a to top surface of a circular body, wherein the top surface is arranged into three areas: an inside, a middle, and an outside. The inside area contains the plurality of storytelling cue elements, and, to that end, is divided into four pie sections, wherein each section has the literal spelling of the words WHEN, WHAT, WHERE, and TRUTH, respectively set forth therein. Alternatively, rather than containing the plurality of storytelling cue elements, the middle area may be left blank, or it may contain a filler comprising a logo, a hologram, an illustration, a graphic design, and the like, wherein the filler may either be directly applied to the surface of the inside area or which may be affixed thereto via an adhesive or by other attachment means.

Referring to FIG. 3, rather than, or in addition to, having the plurality of storytelling cue elements disposed in the inner area of the top surface, as shown in FIG. 1, the plurality of storytelling cue elements may be placed within an inner area on the reverse bottom surface of the disc. In this embodiment, the disc further comprises an indicator element which is movable in relation to the disc, and which randomly selects a particular storytelling cue element to be used in the telling of a story. As shown in FIG. 3, the indicator element comprises an arrowhead-shaped piece which is contained within a bubble, wherein the bubble has a top surface that is raised above the surface of the bottom surface, thereby allowing for a base or platform onto which the disc can spin when rotated or spun by a player. The arrowhead-shaped piece is loose within the bubble so that it can move as the disc rotates. Once the disc has stopped its movement, the arrowhead-shaped piece also stops movement and points to the storytelling cue element that is to be addressed in the story. As will be discussed in greater detail below, this embodiment is particularly advantageous when playing the history faker game.

Although a bubble has been described as providing a base or platform upon which the disc can spin, it is further contemplated that the disc may be capable of spinning or rotating by other rotational means. For example, such other rotational means may comprise a spring, a crank spring, or some other like actuating element.

Again referring to FIG. 1, the middle area of the top surface of the disc contains the plurality of general subject elements, and their respective subtopics, wherein the general subject elements and/or the subtopics may also be depicted in graphics and/or with lenticular changing graphics. In the embodiment depicted in FIG. 1, the middle area comprises twenty general subject words arranged like wheel spokes around the center, and two related subtopic words per general subject word also arranged in radial fashion around the center of the disc. The outside area contains the plurality of situational elements. In the embodiment shown in FIG. 1, the outside area is divided into four pie sections, wherein each section has the literal spelling of the words FIRST, NEXT, LAST, WORST and BEST, respectively set forth therein. The disc, then, is divided into sections, wherein each section comprises a single situational element and one or more general subject elements, and, when used, subtopic elements corresponding to a respective general subject element. In the embodiment depicted in FIG. 1, each section comprises a singe situational element, 5 general subject elements, and 10 subtopic elements. Although the embodiment in FIG. 1 depicts a specified number of general subject elements and subtopic elements, it is to be understood that any number of general subject elements and subtopic elements may be used. Additionally, the actual words used may be in any language and/or may be in Braille.

Based on this arrangement, pairing of a particular situational element with a particular general subject element occurs by a player's random selection of a general subject element. The situational element which is to be the topic of the story, then, is that situational element which is contained within the section of the disc which also contains the randomly selected general subject element.

To assist the player in randomly selecting a general subject element, the gaming device may further comprise an indicator. Exemplary indicators comprise, for example, a cover, a pointer, game pieces, and the like. Alternatively, rather than incorporating an indicator, a player may use his hand to select the general subject element.

An exemplary cover, which is depicted in FIG. 5, comprises an open slot 2 that allows for the visibility of a single general subject element, and another open slot 4 that allows for the visibility of a single storytelling cue element where the plurality of storytelling cue elements is on the top surface of the disc. The cover covers the inner and middle areas of the disc, such that the inner and middle areas are only visible via the slots 2 and 4 formed on the cover. Preferably, the cover does not cover the outer area such that the plurality of situational elements is visible. In this embodiment, the cover is rotatable about the disc, such that during play, the cover is rotated and then stopped to reveal the general subject element and the situational element that is to be incorporated into a story. Referring to FIG. 11, the cover and disc may be assembled via male and female oriented snaps.

An exemplary pointer is depicted in FIG. 6. Referring to FIG. 10, the pointer may be attached to the disc via a magnet, a female snap, a rivit rod, a male snap, and a bottom cap.

Where the disc is to be assembled to include one or more discs, and/or one or more indicators, various attachment elements may be used to create such an assembly. An exemplary attachment element utilizes conventional button snaps to attach the pointer to the disc, wherein the disc may be fixed with a male end of the snap and the pointer may be fixed with a female snap. Together, these snaps allow for the use of a variety of interchangeable pointers, sandwich combinations, and disc storage possibilities. Additionally or alternatively, a spin nub or mushroom cap may be used, wherein such a nub may comprise a rubbery bump placed in the center of the disc to aid in spinning and to prevent sliding.

In another embodiment, two or more discs may be assembled together as a sandwich (refer to FIG. 11), wherein, a sandwich is a combination of discs, indicators, and/or snaps that assemble together to create a multi-functional game. An exemplary game incorporating this embodiment comprises a disc having the plurality of situational elements and the plurality of general subject elements in a language on a top surface, and another disc having the plurality of situational elements and the plurality of general subject elements in another language on a top surface, wherein the two discs are positioned such that the two top surfaces face away from each other.

An alternative indicator may comprise a player's hand. In this embodiment, the disc is rotated and stopped by the player's finger when the finger is placed directly on the middle area. Once the disc is stopped, the position of the player's finger on the disc determines the general subject element and situational element to be used when telling a story. Alternatively to spinning the disc, the disc may be passed to a player top side faced down. The player then pinches the disc and flips it over. The position of the player's finger on the top side of the disc determines the general subject element and situational element to be used when telling a story.

Exemplary game pieces are depicted in FIGS. 8 and 9. As shown in these figures, exemplary pieces include pieces designed as jumpers or balls, but may also include dice, wherein the pieces preferably comprise magnets, such that that piece can be jumped, tossed, or dropped and landed on a general subject element. The game pieces may be made of paper, plastic, rubber, and the like, and are preferably fixed with small magnets.

Although FIGS. 1-3 depict an exemplary disc comprising the basic elements for playing the storytelling game as described below, the disc may be further modified to allow the disc to be used for other applications. For example, referring to FIG. 21, another exemplary disc comprises a magnet disposed between a lenticular map and a holographic sticker bearing the features of the gaming device useful for playing the storytelling game, i.e., the plurality of subject elements, the plurality of situational elements, and, when used, the plurality of storytelling cue elements. In an exemplary application, such a disc would be promoted to store owners and/or franchisees to promote the respective store. Accordingly, in an exemplary embodiment, the lenticular map may comprise a map of a geographic area indicating where the various stores are located. Furthermore, in an exemplary embodiment, the disc may be used as a coaster. Alternatively, in another exemplary embodiment, the disc may comprise a dome and magnet combination.

Referring to FIG. 22, another exemplary disc comprises a static game sticker, which comprises the fundamental elements for play of the storytelling game, i.e., the plurality of situational elements and the plurality of subject elements, applied to a CD or a DVD. The game sticker functions as a protective skin for the CD or DVD. Here, the CD or DVD may be inserted into a respective CD or DVD player to play the audio and/or visual data stored on the CD or DVD. Furthermore, FIG. 22 depicts the game sticker applied to the CD or DVD via a spin device. When the spin device is compressed, cranked, and then, pressed, it spins the disc. Also, the static game sticker may be applied to a coaster, wherein the sticker conceals at least one of the general subject, subtopics, and situational elements. The sticker can be scratched off to reveal the covered general subject, subtopics, and situational elements. This is particularly preferred where the game member is disposable.

Referring to FIG. 23, another exemplary disc comprises a score jumper for use in a variety of currently existing and future developed and manufactured board games, wherein such board games utilize pieces to mark a player's position on the board. As shown in FIG. 23, a top surface of an exemplary disc comprises symbols relating to the situational elements, wherein each situational element is incorporated into its own story. A bottom surface of the disc comprises the plurality of subject elements. The top surface and the bottom surface are arranged to create a game piece that can jump or hop from one point to another on the board, as shown in FIG. 23.

Referring to FIG. 24, the disc, in addition to bearing the indicia for playing the storytelling game, i.e., the plurality of situational elements, the plurality of the general subject elements, and, when used, the plurality of storytelling cue elements, may also comprise a candle member which allows for the placement and storage of candle oil and a wick. Alternatively, or in addition to this embodiment, the disc may further comprise elements that allow for at least one of the following: audio and/or visual recording of the recitation of stories and/or of the recounting of the told stories; a playback of the audio and/or visual recording; a play of music, wherein such music may be for entertainment value or will allow for the timing of the recitation of stories and/or of the recounting of the told stories, and the like. Such features may be accomplished by incorporating at least one of (depending on the function to be achieved) a multi-universal serial bus hookup, a storage device, an audio microphone, a video lens, and the like into the gaming device. The discs can be used as promotional materials and distributed in magazines and newspapers, for example, with promotional ads and information.

Alternatively, rather than providing a hard form tangible disc, specially designed software comprising the game playing elements of the present inventive storytelling game, i.e., the plurality of situational elements, the plurality of the general subject elements, and, when used, the plurality of storytelling cue elements, may be created. Such software may be incorporated into a variety of storage media, including, for example, a desktop computer, a laptop computer, the Internet, mobile phones, Blackberries®, and the like., wherein the screen may be used as a gameboard to inspire conversation.

As stated above, other gaming devices may be used to perform the inventive methods of playing the inventive storytelling game. One such exemplary gaming device comprises a die. In this embodiment, the die is preferably formed to have an equal number of sides as situational elements. Rather than printing the word of the situational element on the respective face of the die, in an exemplary embodiment, each situational element is assigned a shape, and the sides of the die are cut to form a whole having the desired shape. For example, referring to FIG. 12, an exemplary die is in the shape of a tetrahedron, wherein one side of the die comprises a triangular shaped cut-out, an adjacent side of the die comprises a circular shaped cut-out, another adjacent side of the die comprises a star shaped cut-out, and the base side of the die comprises a square shaped cut-out. In this embodiment, the triangle may represent LAST, the circle may represent FIRST, the star may represent BEST, and the square may represent NEXT. However, the shapes may have different meanings depending on the level and type of play.

In this embodiment, another gaming device may be incorporated into the interior of the die. For example, a ball, such as illustrated in FIG. 13, may be placed within an interior chamber of the die. The ball, which comprises a single general subject element on each its individual sides, indicates the general subject element that is to be incorporated into a story. Referring to FIG. 12, after the die is tossed, the player picks up the die, and turns it over to read the bottom of the die. The cut-out on the side of the die facing the player indicates the situational element to be incorporated into the story, and the general subject is determined by the side of the ball that is readable from the cut out facing the player. Furthermore, as shown in FIG. 13, each side of the ball may comprise a single shape indicative of a situational element, so that the situational element to be incorporated into a story may be determined based on the shape showing on the side of the ball closest to the player, or so that the ball may be used without the use of the die.

Another exemplary gaming device comprises a card, which may have the shape and size of, for example, playing cards, a business card, a postcard, a CD cover, a magazine advertisement, and the like. An exemplary card is depicted in FIG. 14. Here an exemplary card comprises four columns, wherein the first column comprises a means for determining which general subject and situational element are to be incorporated into a story, the second column comprises the plurality of general subject elements, the third column comprises the plurality of subtopics, and the fourth column comprises the plurality of situational elements. In an exemplary embodiment of play, the card is to be used in association with the conventionally known and played paper-rock-scissors hand game. In this embodiment, the means for determining which general subject and situational element are to be incorporated into the story is set forth in the first column, and comprises the word and/or symbol for a tie, i.e., when two or more players all throw out the winning hand gesture, the word and/or symbol for paper, the word and/or symbol for rock, and the word and/or symbol for scissor. A group of general subject elements, and their general subject elements' respective subtopics, are arranged next to their respective means in the respective second and third columns.

To initiate a storytelling, each member of the group throws out his/her hand into either the rock, scissor, paper gesture. The winning player looks at the means column on the card to find the gesture that matched the winning player's hand gesture, and picks the general subject element that is assigned to such means column. For example, for the card depicted in FIG. 14, should the winning player have thrown out scissor, then the general subject elements that he may choose from are WATER, TRIP, PLAY, FORT, and SNOW. The related subtopic for each general subject element may also be used to assist the player in remembering or creating a story for telling.

Figure 15:
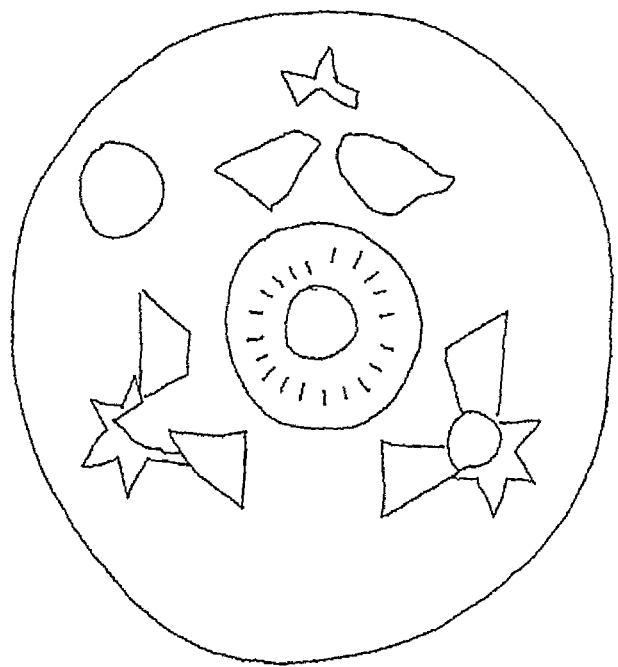
FIG. 15 is a schematic depicting another exemplary gaming device in the form of a game board.
Figure 16:
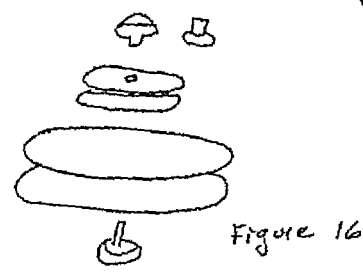
FIG. 16 is a schematic depicting an exemplary assembly of the gaming device depicted in FIG. 15.
Figure 17:
FIG. 17 is a schematic depicting an exemplary application of an exemplary game board and an exemplary ball, and an exemplary game piece.
Figure 31:
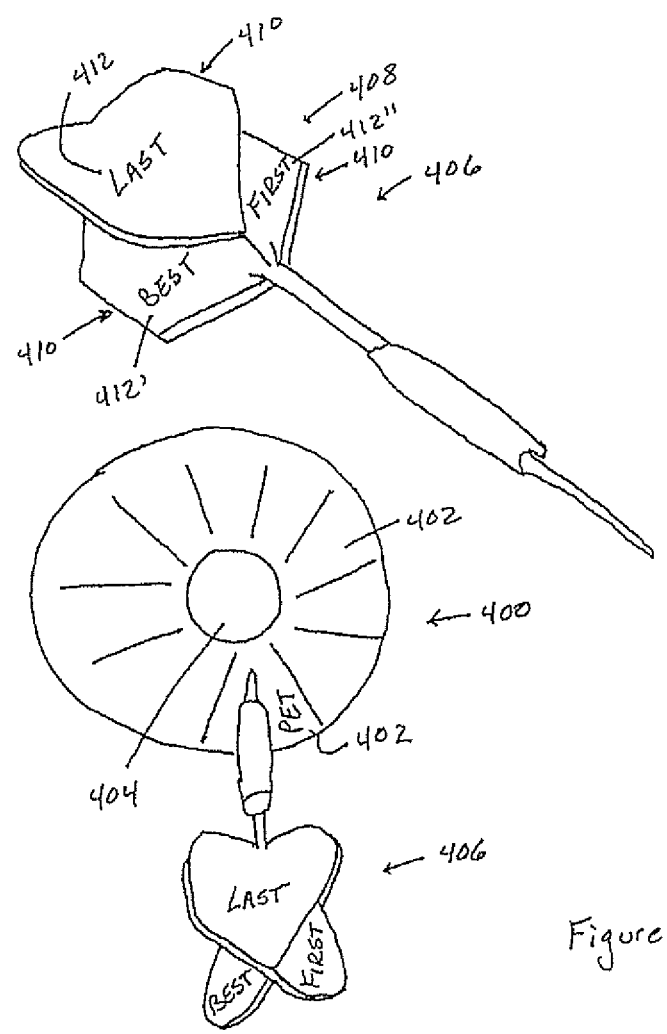
FIG. 31 is a schematic depicting another exemplary gaming device, and method of play.

Another exemplary game member is a game board, wherein an exemplary game board is depicted in FIG. 15. Here, the game board comprises a map of a road connecting the shapes and beaches of an island with a general subject element attached to the middle with a rivit or snap. In this embodiment, then, the island is the disc as described above. In an exemplary method of play, a player may spin the island and/or land a jumper, for example, as discussed above, on the island. Where the jumper sticks is the situational element, and the closest general subject element is the topic of the story. In an exemplary embodiment, a back side of the game board comprises a dartboard. In this embodiment, a dart may be incorporated, wherein the dart comprises the situational elements (see FIG. 31). Here, a dartboard 400 comprises a plurality of subject elements 402 displayed radially from a center point 404. A dart 406 comprises a tail end 408 comprising a plurality of flanges 410, wherein a top surface of each flange comprises respective situational element 412, 412', and 412".

In this embodiment, dart 406 is thrown towards dartboard 400, and dartboard 400 catches dart 406 such that dart 406 lands within a region on dartboard 400 representative of a particular subject element. The situational element to be paired with the subject element is selected based on which flange 410 bearing a particular situational element is facing a particular direction. For example, if the dart is thrown and caught by the dartboard such that dart 406 lands within a region corresponding to the PET subject element, and flange 410 bearing the "LAST" situational element is facing upwards towards a ceiling, then the players must tell a story incorporating the LAST situational element paired with the PET subject element.

Where it is important to keep score, i.e., where an object of the game is for a player to tell and/or to recite from memory an already told story for all of the situational elements, the inventive storytelling game may further comprise a scoring tool, wherein the scoring tool allows a player to keep tabs as to which of the situational elements the player has already incorporated into a story, and which of the situational elements still need to be incorporated for any particular storytelling game. Exemplary scoring tools are depicted in FIGS. 18-20.

Figure 18:
FIGS. 18-20 are schematics depicting exemplary scoring tools.

Referring to FIG. 18, an exemplary scoring tool comprises a score card depicting a symbol for all of the situational elements. Once the player has told a story or recounted from memory an already told story, the player scratches off the appropriate symbol.

Figure 19:
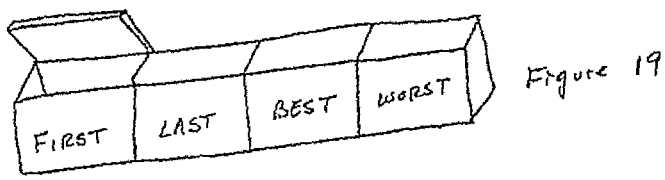

Referring to FIG. 19, another exemplary scoring tool comprises a score box having a set of compartments, one compartment for each situational element, wherein the individual situational element is depicted as a symbol on the respective compartment. Each compartment can be flipped, such that once the player has told a story, or recounted from memory an already told story, emphasizing a particular situational element, the player flips the compartment bearing the appropriate symbol representing the particular situational element.

Figure 20:
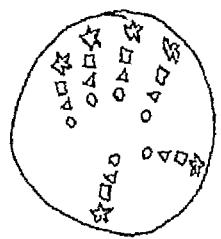

Referring to FIG. 20, another exemplary scoring tool comprises a score popper comprising a flexible sheet that can be reversibly indented. The top face of the sheet bears a distinct symbol for each of the situational elements. Once the player has told a story, or recounted from memory an already told story, emphasizing a particular situational element, the player indents the sheet at the position of the representative symbol. Once the game is over, the indentations of the sheet may be removed by popping the sheet out in the reverse direction.

In another exemplary embodiment, the gaming device may comprise an electronic device, wherein at least one of the plurality of subjects, plurality of subtopics, and plurality of situational elements may be randomly and electronically generated. In an exemplary embodiment, at least one of the plurality of subjects, plurality of subtopics, and plurality of situational elements is displayed on display screen, which may include, for example, a liquid crystalline display ("LCD") screen, and/or may be announced via auditory means. Also, in an exemplary embodiment, an electronic version of the gaming device may further comprise a recording member for recording a player(s) storytelling, a round of play, or an entire game of storytelling. Furthermore, the electronic version may comprise a microphone for amplifying sound and/or for assisting in the recording of a player's voice.

Figures 27, 28:
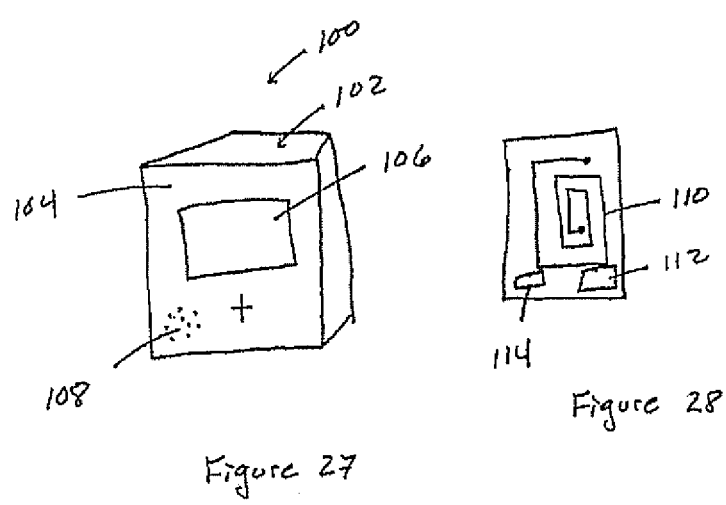
FIG. 27 is a schematic depicting an exemplary electronic gaming device.
FIG. 28 is a schematic depicting an exemplary electric circuit of the gaining device depicted in FIG. 27.

An exemplary gaming device is depicted in FIGS. 27 and 28. Here a gaming device 100 comprises a housing 102 having disposed on a front exterior side 104 thereof, an LCD screen 106. Further disposed on side 104 is a microphone 108. Disposed within housing 102 is an electronic circuit 110 which pairs a subject element with a situational element and displays the pair on LCD screen 106. Also disposed within housing 102 is a recording device 112 which records the story as it is being told. Gaming device 100 may further comprise an electrical scoring circuit 114 capable of keeping score in a manner in accord with the manner of play described herein, wherein the score may be displayed on LCD screen 106.

The present invention further comprises a story-telling gaming system comprising a gaming device, wherein the system is used to distribute an individual's story or a group of individual's stories to an audience. In this embodiment, the gaming device comprises a means for recording a story, a means for transmitting the story to a database, a means for downloading the story from the database to an audience member, a means for audibly and/or visually displaying the story, and a means for storing the downloaded story.

In an exemplary embodiment, the story-telling gaming system may further comprise a musical component, wherein a player may select and download pre-recorded music from a database, wherein the pre-recorded music preferably relates and feeds into the general mood created by a particular story. Once the pre-recorded music is accessible to a player, the player recounts a story to the pre-recorded music such that the story and the pre-recorded music are recorded as a single piece of work. This work is then uploaded to a central database via the Internet, for example. The work is stored in a virtual library, where it may be accessed by others, via, for example, the phone, Internet, or i-pod. Preferably, participants in the music story-telling gaming system are subscribed members to a host entity, wherein the host entity controls, monitors, and regulates the uploading and downloading of the pre-recorded music and the works generated by the members. In such an embodiment, the system may comprise a gaming device comprising a touch sensitive LCD, a microphone and/or speaker, one or more USB connector ports with retractable pull out wires, a music memory card, and wireless/mobile connectivity to voice/text message conference line.

In another exemplary embodiment, a story-telling gaming story system comprises a means whereby players interact with each other via the Internet. In this embodiment, the system may include the same or different components as described above, but also comprises a means whereby a group of players in remote locations from each other can interact with each other. Such interaction includes storytelling to and/or without music, and having players vote on which stories are their favorites. Additionally, players may tell stories wherein a particular element of the story is false. Other players may then try to guess which element of the story is false. The play under this scenario could be conducted in real-time, wherein the players are interacting with each other over, for example, the Internet. Under this system, the players would be able to view and/or listen to the stories either as the stories are in real time being told, or at some point after the stories are told.

In another embodiment, the gaming system comprises recording storytelling audio and/or visual recording, wherein the video is monetized, distributed, and tracked.

Figure 29:
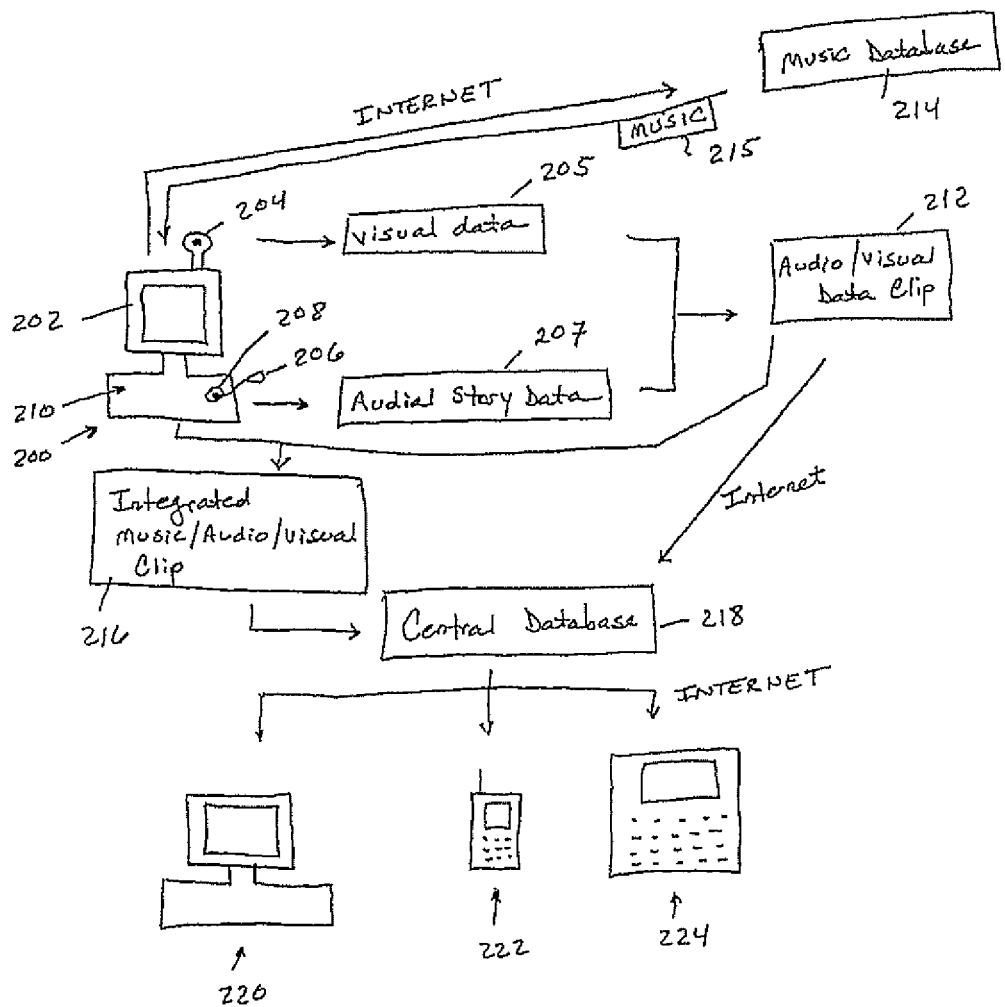
FIG. 29 is a schematic depicting another exemplary method of play.

An exemplary embodiment representative of the above-described system and method of play is depicted in FIG. 29. Here, an exemplary gaming device comprises a desktop computer 200, a camera 204 integrated with computer 200, and a monitor 202. Computer 200 comprises a microphone 206 plugged into a port 208 located on a housing 210 of computer 200. Installed on a hard drive of computer 200 is software (not shown) specially designed to pair subject elements with situational elements. In this embodiment, a player accesses the software to generate a subject element/situational element pairing. Speaking into microphone 206 and while looking towards camera 204, a user creates and orally tells a story based on the subject element/situational element pairing. As is known in the art, camera 204 creates visual data 205 which is fed into a storage device of computer 200, while an audio converting device, as also known in the art, which is contained within housing 210, creates audial story data 207. A converter integrates audial story data 207 with visual data 205 to form an audio/visual data clip 212.

Audio/visual data clip 212 may be transmitted in a conventional fashion, such as, for example, via the Internet, to a central database 218 where it may be stored. Alternatively, a music database 214, which serves as a music depository, may be accessed via, for example, the Internet, to select and download a particular piece of music 215 to computer 200. Music 215 may then be integrated with audio/visual data clip 212 to generate an integrated music/audio/visual clip 216 which may also be uploaded and stored on central database 218.

Another gaming device, which may be in the form of a computer 220, a cell phone 222, and a personal data manager 224, for example, may access central database 218 via, for example, the Internet, to download audio/visual data clip 212 and/or integrated music/audio/visual clip 216.

Figure 30:
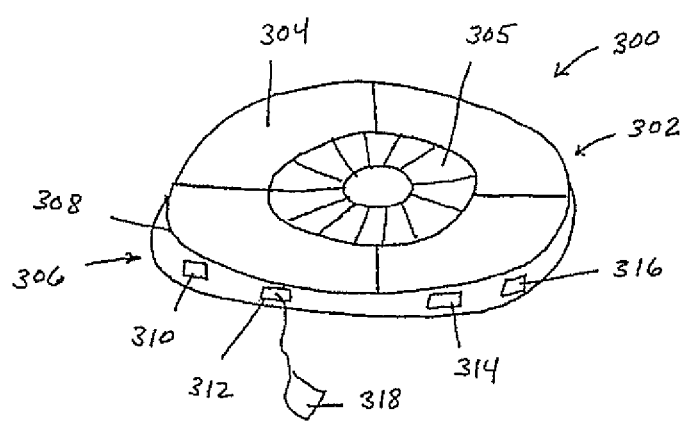
FIG. 30 is a schematic depicting another exemplary gaming device.

Another exemplary gaming device is depicted in FIG. 30. Here, a gaming device 300 comprises a top 302 having a plurality of situational elements 304 and a plurality of subject elements 305 disposed thereon. Gaming device 300 further comprises a housing 306 having exterior sides 308. Disposed on sides 308 are a USB port 310, an audio microphone port 312, a video port 314, and a port for Internet access 316.

Audio microphone port 312, which receives a microphone 318, leads to a recording device (not shown) contained within housing 306, wherein the recording device records the verbal recitation of a story. The sound recording comprises audial story data which is transmitted from the recording device by a transmitter (not shown) and sent to a data processor (not shown) also contained within housing 306. The recording device, the transmitter, and the data processor may be those conventionally known to perform recording, transmitting, and processing of sound data.

Video port 314, which receives a video lens, leads to a visual data recorder (not shown) contained within housing 306. The video lens captures video images of the storyteller as he is telling the story. The visual data, which represents the video images, are transmitted to the data processor. The video lens and visual data recorder may comprise those conventionally known in the art to perform the recording, transmitting, and processing of visual data.

The data processor can integrate the auditory data with the visual data to derive an integrated auditory/visual data clip. Such clip can then be uploaded to a central database via, for example, the Internet in like manner as described above with reference to FIG. 29. It is further noted, that gaming device 300 may also be equipped to download music files as described above with reference to FIG. 29, and to incorporate the music into the auditory/visual data clip. It is also noted, that the audio capturing and video capturing techniques described herein may be conducted by a single audio/visual recording device.

Now that the gaming device has been generally described, and exemplary embodiments of the gaming device have been illustrated and described with sufficient specificity, the general method of play, along with exemplary methods of play for the specific gaming devices, shall be discussed.

The general method of the present invention comprises gathering a group of players, wherein the group comprises at least two players, wherein a group of 4 to 10 players is preferred, but can comprise as many players as is desirable provided that the group is greater than one. One of the players from the group manipulates the gaming device, e.g., spins or passes the device if it is a disc, tosses the device if it is a die and/or a ball, etc., or, if the gaming device is a card, the players in the group throw out their hands to form rock, scissors, or paper, such that a situational element is paired with a general subject element.

Once the pairing has been made, the player recites a story related to the pairing. Should the player have difficulty in coming up with a story, the subtopic elements corresponding to the particular general subject element may be used to assist the player in jarring a memory. After the player has recited the story, play passes to another player in the group, wherein such player manipulates the gaming device to randomly make another pairing. This next player then recites a story based on this pairing. Play continues in this fashion until all of the players have recited or attempted to recite a story. After all of the players have had a turn reciting a story, each player then takes a turn at recounting at least one story from the group of recited stories. The winner of the game may be determined in a variety of ways, including, for example, the player who recites the best story, the player who best recounts another player's recited story, the player to first recite a story for each of the situational elements, and the like.

Figure 26:
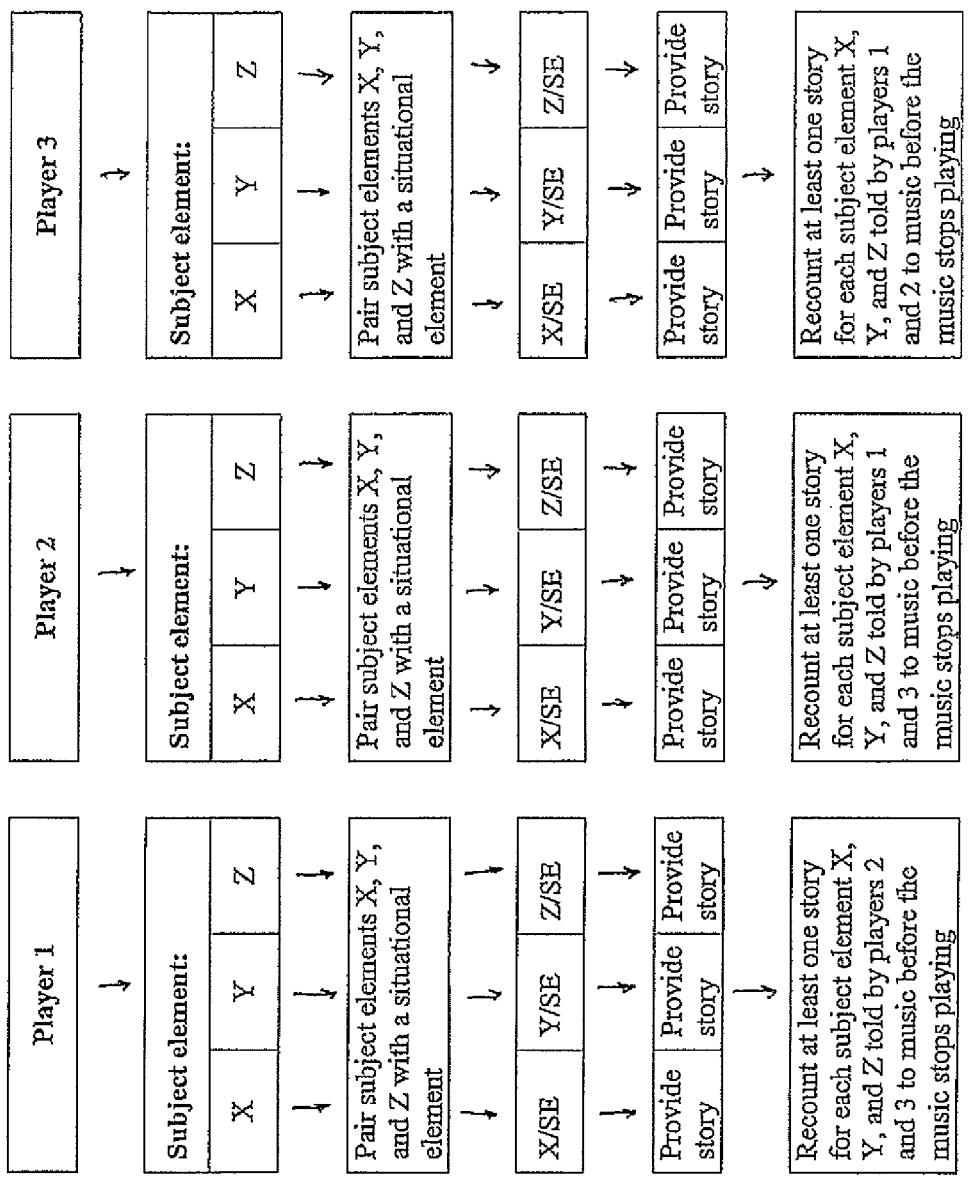
FIG. 26 is a schematic depicting another exemplary method of play.

Another exemplary method of play is depicted in FIG. 26. Referring to FIG. 26, an exemplary method comprises a Player 100, a Player 102, and a Player 103. In this embodiment, the gaming device comprises three subject elements: X, Y, and Z. The players take turns manipulating a gaming device in any manner, and which may include a manner such as previously disclosed above herein, to derive a subject element which will form the topic of a story, and to derive a situational element which will qualify the topic of the story. Upon pairing a subject element with a situational element ("SE"), the player tells a story based on the particular X/SE, Y/SE, or Z/SE combination. Once all of the players have created and told a story for each of the three combinations, the players recount at least one story told for each subject element from the other players. In another exemplary embodiment, the stories are recounted to music, wherein the goal is to recount the stores before the music has ended.

The above-described general method of play may be modified to arrive at a number of derivative games, wherein exemplary derivative games are described below. One exemplary derivative game, which is referred to as "memory shaker," stimulates and teaches the art of language and enhances communication skills. Another exemplary derivative game, which is referred to as "mystery maker," is a social strategy for getting the players to practice their listening skills and common etiquette. "Mystery maker" further promotes memory skills as players earn points for good memory by asking other players to describe the details of a story from memory. And another exemplary derivative game, which is referred to as the "history faker," is a competitive game for turning true stories into fiction by bluffing about one fact. All of these games employ the general method stated above, and further comprise elements which are set forth below.

Memory Shaker.

This derivative method is focused toward trading and remembering random stories about a player's past, present, and future. This memory game is centered on repeating such types of stories after each round and rewarding the player with the best memory. The memory game begins by selecting a host who will set certain parameters for that particular round of play, e.g., whether the players will be timed or not, whether the players will be penalized for not including all or certain storytelling cue elements into the story, etc. The game is broken down into three stages: a story round, a memory round, and a final showdown, and the object of the memory game is to be the last player to retell a story during their turn in the final memory showdown.

The game begins with a story round. Here each player takes a turn at manipulating the gaming device to arrive at a general subject element and a situational element pairing, and at telling a story based on this pairing.

Once all of the players have told a story, the memory round begins. During the memory round, the host competes against the rest of the players in the group. The host retells one story at a time while alternating each turn with a different player until someone wins the round by being the last player to retell a story within a certain allotted time frame, or if not timed, then, the last player to accurately recount a story. Players may pass their turn to another player by specifically naming such other player.

To begin the memory round, the host chooses any player to begin and the order of play (e.g., clockwise or counterclockwise). Where the memory round is to be timed, and where the gaming device comprises a disc, the disc may be spun to set the time where the time begins once the disc begins to rotate, and ends when the disc stops rotating. Timing may also be done to music, a watch, an hourglass, and the like.

The player chosen to start off the memory round (Player A), retells any one story from the most recent round and the host will follow by recapping another story. Preferably there are rules dictating how a story is to be retold or recapped, wherein the only real rule is that the players must listen, and the other rules may include any one or more of the following:

The recap must include the story topic and one correct detail;
No repeating of any part of a previously recapped story or any part of a currently recapped story;
A player is eliminated from the round if he/she does not start the recap within a given amount of time;
Players cannot provide verbal hints to the player who is recapping, although clues may be non-verbal; and
No use of the player's personal names.

The next player in line after Player A will also retell a story and then it's back to the host for another turn. Play continues in order with the host taking every turn between group members. The round order continues like this until the timer stops or someone cannot remember a story to recap and passes.

The winner of the memory round is the last player able to retell a story during his/her turn before the timer stops. Or, if all stories have been retold within the allotted time, or if a timer is not used, then the winner is the player that completed the last story from the round. If a player breaks a recap rule or passes his/her turn because he/she cannot remember a story, that player is eliminated and the person next in line must recap a story before it is again the host's turn. If all of the following players also pass and it goes all the way around back to the host, the host will win because the host has told the last story of the round. If the host, however, breaks a recap rule or passes during his/her turn, the host is eliminated and the last player that recapped a story is the new host. After switching the host, the next player in turn is the same player that would have gone after the original host had the original host not passed. Continue alternating turns between the new host and the non-eliminated players until there is a winner. The winner of the recap chooses the new host for the next round.

At least two more rounds are then played to determine additional winners. Players, who have won two or more rounds, appoint another player to represent that winning round(s) of play in the showdown.

The memory game ends in a showdown round. After the group has played two or more rounds of story trading and recapping, the round winners face off against each other in a final memory challenge. Here, the round winners take turns and alternate recalling stories from all of the rounds. The last round host begins and the last player able to recap a story wins the entire game. Like the storytelling and memory rounds, the showdown round may also be timed.

Mystery Maker.

The mystery maker derivative game adds strategy to avoid gossiping about the people involved. Here a person or character is described without using any names. This game may be played in like fashion to the memory maker game discussed above, except that no proper nouns may be used. Such use causes the player who uses the proper noun to be eliminated from that round of play.

History Faker.

This game is most preferably played with a disc comprising a movable indicator disposed on the bottom surface of the disc, such as that depicted in FIG. 3. Like the game derivatives described above, play includes a storytelling round and a memory round; however, the history faker game differs from the other games in that it involves the telling of a true story with the exception of including a possibly falsified storytelling cue element.

The storytelling round is begun by picking a story topic using the gaming device. Then, where the gaming device is a disc, the disc is flipped over to see at which storytelling cue element the indicator is directed. If the indicator is directed at the word and/or illustration for TRUTH, the player is not to change any part of the story; however, if the indicator is directed at the words and/or illustration for WHERE, WHEN, or WHAT, then the player is to change that particular storytelling cue element when telling the story. After the player has told the story, the host tries to guess which storytelling cue element, if any, has been fabricated. To that end, the host may ask at least one question of the storyteller before making a choice. If the host guesses correctly, the player who told the story is not allowed to play in the memory round. However, if the host guesses incorrectly, the storyteller becomes the new host. At the end of the round, the host plays a memory round with all of the previous hosts from that round. The last player able to recap a story during his/her turn wins the history faker game.

ALTERNATIVE EMBODIMENTS

Discussed below are further adaptations to the method of playing the storytelling game of the present invention, wherein it is understood that the embodiments are merely illustrative only, and include modifications and derivations thereof as would occur to one of ordinary skill in the art.

Alternative Embodiment I

The storytelling game is begun by picking a host. The leader tells the first story of the first round based on the pairing of the situational element and the general subject element by the gaming device. Play continues in the direction chosen by the host. After that, the host chooses another player to start the round and the host is the last speaker. The host changes each time there is a new winner.

A winner may be selected as follows. Players try to get points for each of the situational elements, by telling a story reflective of each of the situational elements. For example, if there are four situational elements, then, the player must tell at least four stories, wherein each story is based on one of the four different situational elements. The player must also be able to recount at least one story told in a particular round to make it to the next storytelling round. The first player to tell a separate story for each of the situational elements wins. Score may be kept with a scoring tool, such as was described above with reference to FIGS. 18-20.

Each time a player cannot remember a story he/she may be required to take away a point. The winner from any particular round is the new host for the next round.

Alternative Embodiment II

To shorten the playing time of the inventive storytelling game, the game may be modified in one of many ways. For example, scores may be kept for the entire group, or the group may be split up into teams. The player to get the last needed story situation, i.e., to tell a separate story for each of the situational elements, may retell those stories that earned points for the other teams; if the player misses a story, then the player may lose a point. Another option is to not keep score and instead keep track of all the players who had a particular situational element as their story situation in that round, e.g., all the players who had the word BEST as their story situation. Then choose one of these players to recap the round to win.

Alternative Embodiment III

Passing may be incorporated into any of the games described herein at no cost to the player whose turn it is to recite a story. However, passing may help others earn bonus points. However, if a player does not pass and takes too long to start reciting a story, he/she may lose his/her turn, or not receive a point for his/her story.

Bonus points may be given for playing off a pass. If a player cannot think of a story, then another player may try. In this embodiment, the gaming device comprises a bonus word on each quarter section (see, for example, the disc set forth in FIG. 1, wherein the bonus words comprise the words EVERYONE (any player in the group), PICK (player of the speaker's choice), TAKE (free point for the speaker), and NEXT (either player next to the speaker and the first to get the shot)). If a subject is passed, the player who takes up the task of reciting a story after another player has passed, may tell a story about his/her life or one that relates to the player who passed so long as that player provides his/her permission.

Alternative Embodiment IV

The invention contemplates that the host may implement a series of penalties for fouls committed during the course of the storytelling game. Fouls may include without limitation, for example, using proper nouns; leaving during a round or a story without being excused by the leader; providing stories that are inappropriate, either based on language and/or content, for the group; waiting too long to begin reciting a story; asking questions during a story; rambling on or straying away from a subject; interrupting a story; talking out of turn; failing to adhere to proper etiquette, and the like.

The penalties for a foul may comprise "benching" a player, wherein the player loses a turn and/or a point. To get out of the penalty box, the player may be required to recap and summarize all of the stories from the time they were silenced. If two or more people get benched, they may be required to showdown against each other and the loser of the showdown takes the bench, and the winner of the showdown resume play with the group.

Alternative Embodiment V

Show-Down Alternative

Playing this way adds interaction, luck and random scoring to the game. It incorporates the conventionally known paper, rock, and scissor hand game: paper covers rock, rock crushes scissor, scissor cuts paper. If there is a tie, play is repeated until there is a winner. Moving around the group, each player showdowns against the players in front of him/her, one story for each showdown, but only the winner will get to tell a story. Depending on luck, a player may get zero, one, or two chances to tell a story in any given round. To perform this embodiment, an exemplary gaming device comprises symbols to show how the winning shape determines the situation of a story. In case of a tie, play again, and the winner of the tiebreaker may tell about his/her BEST experience regardless of the next winning shape.

Alternative Embodiment VI

Court

This level of the game was developed so players could compete against each other without having to keep points. These rules are based on the structure of a monarchy or royal court. Players compete for the top spot by challenging and nominating each other for positions, wherein not all of the positions are desirable. Playing with a COURT requires four or more players which are identified as the sheik, the freak, the geek, and the squeak (also called "speak"). The sheik is in charge of keeping all of the players talking. The freak is the player in charge of asking questions of the six senses. The geek is the player in charge of keeping pace by asking factual questions. All of the other players are squeaks, who are responsible for telling the best story possible so that they can move up in the ranks of the court.

All rounds start with the freak and end with the sheik. All of the players, except for the geek, get a chance to tell a story. The geek is responsible for listening to the story, and retelling the story in a round of play. The roles of the court members are set forth in FIG. 25.

Alternative Embodiment VII

Classroom/Lunch-Ins

A classroom is split into groups of about 5 to about 8 people per tale. Each table is given a gaming device, and each person casually exchanges stories amongst their table until everyone has had a turn to tell a story. A room-wide memory round is then conducted. A player is chosen from each table to be the story recapper for the round. The teacher or MC alternates around the room by asking each table to recap one story each from their group. A timer may be set. Tables that pass or forget elements of the story are eliminated, and the last table to recite a story wins the memory round. In an exemplary embodiment, everyone get a turn to talk. A table will not win unless the entire group listens. The winner gets an extra interview or gets to recap or request a repeat of their favorite story.

Alternative Embodiment VIII

Meetings/Interviews/Clinics/Date/Recap Variations

One person tells the majority of the stories and another person does all of the summarizing. Then switch, and let the other person or group do the recapping. Or exchange stories amongst a group and have one player do the remembering. Or have the selected recapper draw personal connections or similarities to others while mentioning and recapping their stories.

Alternative Embodiment IX

Game show/Event/Street or Dinner Theatre/StoryOke

Two or three groups of players exchange fake stories and the other groups must repeat and guess the fake parts of the story.

Alternative Embodiment X

Musical StoryOke

Each player from a group tells a story using the gaming device. A select number of persons from the group are then chosen to recap the stories against each other timed to a song that gets faster and faster, wherein the players recap the stories to the pace of the music. The player who remembers the last story wins.

Alternative Embodiment XI

Telephone Conference Call/Musical EI StoryOke

Callers are given a number and thrown into a chat queue divided by area codes and given a turn to tell a story to music. After the group has each told a story two callers will be randomly selected to recap against each other timed to a song that gets faster and faster, wherein recapping occurs to the pace of the music. The caller who remembers the last story wins.

Alternative Embodiment XII

Internet Video Game/Social Network

Virtual version of the storyology board games. It is similar to an on-line open microphone variety show.

Alternative Embodiment XIII

Personalized Game Characters

Communicate and connect in different places and events on an imaginary island by sharing similar stories that affect the outcome of the journeys. The objective is to become signed professionally for a player's hobby, vocation or avocation depending on the choices made and stories the player connects with. The players may meet up in real or virtual venues and the stories that connect with them may serve as promotional content for the real or virtual blog spots. The moments may be affected by weather, illness, hitchers, gifts and losses.

Alternative Embodiment XIV

Promo Content (Crown Sourcing)/U-Tube (Product Placement)

Groups shoot conversations exchanging stories about their neighborhoods, highlighting outdoor activities, landmarks, dining, and entertainment. The physical location that the story game is played will serve as a virtual reality web commercial. After the episode, owners, civil servants, and celebrities add their perspectives of the same memories and events. The premise is to add alternative dimensions and community connections to physical public space.

Alternative Embodiment XV

Bouncy Out Door (Carnival Cruise) Game Show Island

Kids are real life playing pieces on a blowup raft like game board. Adults sit and play from sidelines and move their children like pawns across the island to converse, compete and interact by drawing connections with other families.

As many different embodiments of this invention, including the gaming device and the method of play, will now have occurred to those skilled in the art, it is to be understood that the specific embodiments of the invention as presented herein are intended by way of illustration only and are not limiting on the invention.

What is claimed is:

1. A method of play, comprising:
providing a gaming device, wherein the gaming device comprises a first indicator; a second indicator; and a board having a front side oppositely situated to a back side, wherein the second indicator comprises a member which is disposed on and extends from the back side, and wherein the board has displayed thereon:
a plurality of general subject elements, wherein each general subject element from the plurality of general subject elements comprises a topic for a particular story;
a plurality of situational elements, wherein each situational element from the plurality of situational elements qualifies one or more of the general subject elements from the plurality of general subject elements wherein the plurality of general subject elements and the plurality of situational elements are radially disposed on the front side of the board, and further wherein the plurality of general subject elements is divided into subgroups, wherein each subgroup comprises two or more general subject elements, and further wherein each subgroup is aligned with an individual situation element from the plurality of situational elements to from a section, and further wherein a placement of a single general subject element forms a subsection; and a plurality of cue elements,
wherein the cue elements from the plurality of cue elements are radially arranged on the back side of the board;
selecting a general subject element from the plurality of general subject elements with the first indicator;
pairing the selected general subject element with a situational element from the plurality of situational elements, wherein the situational element is selected by the first indicator;
selecting a cue element from the plurality of cue elements, comprising having a first player spin the gaming device such the member of the second indicator serves as a base onto which the gaming device may spin; and
having the first player tell a story based upon the paired general subject element and the situational element.

2. The method of claim 1, wherein the second indicator further comprises an arrowhead that moves within the member, and wherein manipulating the second indicator to select the cue element further comprises having the first player pick up the gaming device and look to see at which cue element the arrowhead is pointing.

* * * * *